US010459574B2

(12) United States Patent
Thomas et al.

(10) Patent No.: US 10,459,574 B2
(45) Date of Patent: Oct. 29, 2019

(54) DISPLAY INCLUDING HOT MIRROR (71) Applicant: Hewlett-Packard Development Company, L.P., Houston, TX (US)

(72) Inventors: Fred Thomas, Fort Collins, CO (US); Bruce Blaho, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/500,228

(22) PCT Filed: Jul. 31, 2014

(86) PCT No.: PCT/US2014/049049
§ 371 (c)(1),
(2) Date: Jan. 30, 2017

(87) PCT Pub. No.: WO2016/018340
PCT Pub. Date: Feb. 4, 2016

(65) Prior Publication Data
US 2017/0262090 A1    Sep. 14, 2017

(51) Int. Cl.
*G06F 3/042*    (2006.01)
*G06F 3/0354*   (2013.01)

(52) U.S. Cl.
CPC .......... *G06F 3/042* (2013.01); *G06F 3/03542* (2013.01)

(58) Field of Classification Search
CPC ............................ G06F 3/042; G06F 3/03542
See application file for complete search history.

(56) References Cited

U.S. PATENT DOCUMENTS

| 8,023,079 B2* | 9/2011 | Chen ................. G02F 1/13338 349/1 |
| 2003/0006972 A1* | 1/2003 | Blanchard .............. G06F 3/045 345/173 |
| 2005/0162401 A1 | 7/2005 | Tseng et al. |
| 2005/0227063 A1 | 10/2005 | Lawandy et al. |
| 2008/0036926 A1 | 2/2008 | Chen et al. |
| 2009/0015548 A1 | 1/2009 | Tazaki et al. |
| 2010/0259488 A1* | 10/2010 | Larsen ................. G06F 3/0412 345/173 |

(Continued)

FOREIGN PATENT DOCUMENTS

| WO | WO-2013035990 A2 | 3/2013 |
| WO | WO-2013183849 A1 | 12/2013 |
| WO | WO-2014077593 A1 | 5/2014 |

OTHER PUBLICATIONS

"Gold Nanoparticles: Properties and Applications," 2014, pp. 1-7, Sigma-Aldrich Co. LLC., Available at: <sigmaaldrich.com/materials-science/nanomaterials/gold-nanoparticles.html>.

*Primary Examiner* — Jonathan A Boyd
(74) *Attorney, Agent, or Firm* — Fabian VanCott (57) ABSTRACT An apparatus includes a display stack comprising at least one layer to generate a digital display image. A front stack includes a position encoded contrast layer to provide a pattern of light in response to non-visible light applied to the position encoded contrast layer. The pattern of light encodes spatial information across a surface of the position encoded contrast layer. A hot mirror reflects the non-visible light applied to the position encoded contrast layer of the front stack and is optically transparent to visible light generated from the display stack.

20 Claims, 9 Drawing Sheets (56) References Cited

U.S. PATENT DOCUMENTS

| | | |
|---|---|---|
| 2012/0127114 A1 | 5/2012 | Weaver et al. |
| 2012/0306819 A1 | 12/2012 | Yamazaki et al. |
| 2013/0009119 A1 | 1/2013 | Natan et al. |
| 2014/0022629 A1 | 1/2014 | Powell et al. |
| 2014/0103291 A1* | 4/2014 | Mastro .................. H01L 33/40 257/13 |
| 2015/0293614 A1* | 10/2015 | Kwak .................. G02F 1/0131 349/12 |

* cited by examiner

DISPLAY INCLUDING HOT MIRROR

CROSS-REFERENCE TO RELATED APPLICATION

This application is a U.S. National Stage Application of and claims priority to International Patent Application No. PCT/US2014/049049, filed on Jul. 31, 2014, and entitled "DISPLAY INCLUDING HOT MIRROR," which is hereby incorporated by reference in its entirety.

BACKGROUND

Computer display technology can include variable mechanical dimensions such as the thickness of the display along with varying outer dimensions of the display. In addition to providing an output to users, many displays now come with compatible devices such as digital pens that allow users to not only select items on the display but to record data with respect to a given location on the display such as applying a digital signature to output appearing on the display. Given the almost limitless forms and dimensions of display technology, it has become a challenge to enable such technologies as digital pens universally since the configuration of the display itself can vary significantly.

DETAILED DESCRIPTION

This disclosure relates to a display apparatus and related systems and methods. The disclosure demonstrates that the use of hot mirrors can facilitate reception of position encoded spatial information associated with a display, where the spatial information can be decoded to determine location and movement of a digital pen relative to the display. A display apparatus can include a display stack having at least one layer to generate a digital display image. The display stack typically includes multiple layers, such as including a liquid crystal display, for example, to generate the display image. The apparatus can include a position encoded contrast layer to provide the position encoded spatial information from the display.

The position encoded contrast layer can include position encoded optical elements to provide a pattern of light in response to non-visible light applied to the position encoded contrast layer (e.g., polarized encoded pattern, near-IR reflective/absorptive pattern). The pattern of light encodes the spatial information across a surface of the position encoded contrast layer. A hot mirror can be positioned in the apparatus so as to reflect the non-visible light applied to the position encoded contrast layer and is optically transparent to visible light generated from the display stack. The hot mirror can be positioned in the front stack or the display stack, for example. As used herein, the term "hot mirror", refers to a mirror with significantly different reflection or transmission properties at two different wavelength spectrums or bands. For example, the hot mirror can permit transmission of light in the visible wavelength range and be reflective to non-visible light (e.g., in the IR wavelength range).

The position encoded optical elements can be positioned in the front stack as part of the position encoded contrast layer or can be disposed on the hot mirror itself. The position encoded contrast layer can be illuminated via a non-visible light source (near infra-red) such as from a digital pen, for example. Upon illumination, the position encoded contrast layer returns encoded data back to the source where it can be decoded to determine position and motion of the pen.

The hot mirror can serve multiple functions for the display apparatus. In one example function, the hot mirror reflects the non-visible light applied to the position encoded contrast layer of the front stack back to the source. The reflection from the hot mirror can increase contrast between the position encoded optical elements and the background area of the contrast layer. Since the hot mirror can be positioned in front of the display stack, an another example function of the hot mirror is to be optically transparent to visible light generated from the display stack so as not to interfere (in the visible spectrum) with the generated display image.

Figure 1:
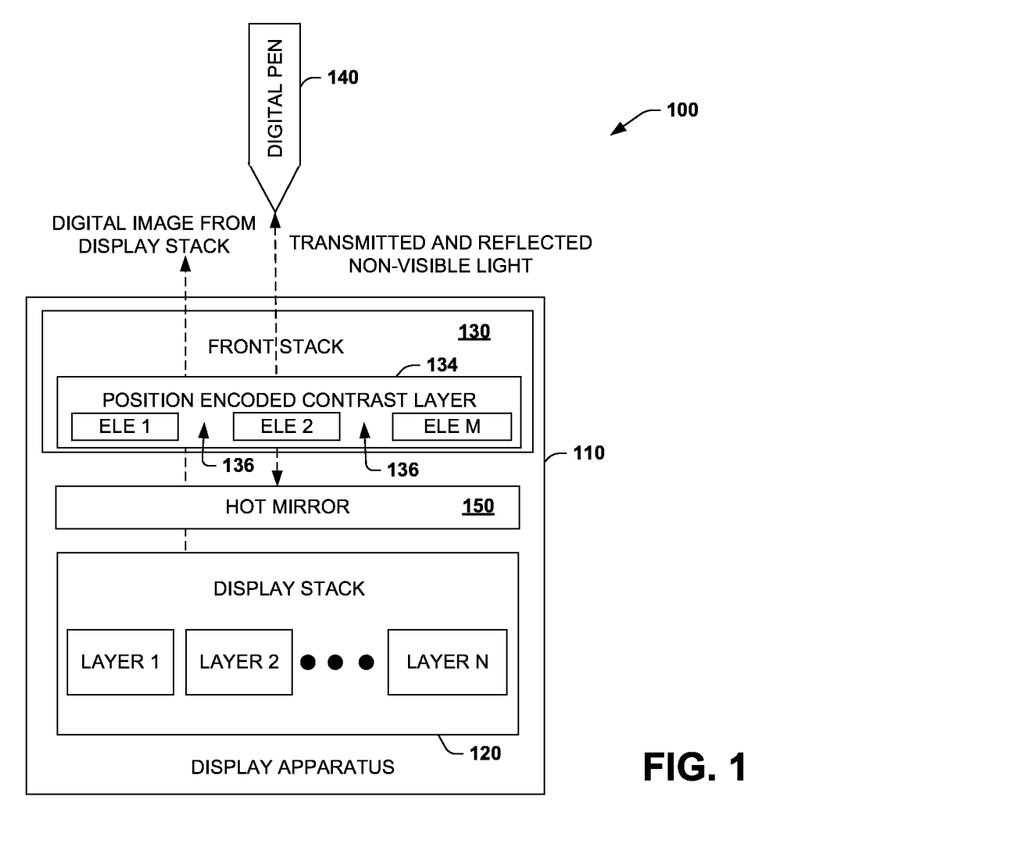
FIG. 1 illustrates an example of a display system in accordance with the principles disclosed herein.

FIG. 1 illustrates an example of a system 100 that includes a display apparatus 110 and a light source, such as implemented in a digital pen 140 in accordance with the principles disclosed herein. The display apparatus 110 can include a display stack 120 having at least one layer shown as layers 1 though N to generate a digital display image, with N being a positive integer. The display stack 120 $i$ includes an arrangement of layers to generate a display image in a visible light spectrum. The display stack 120 typically includes multiple layers, such as including a liquid crystal display or a light emitting diode (LED) display, for example. Other example layers in the display stack 120 can include reflective films, backlighting layers, light diffuser films, light polarizer films, color filter films, and optically clear adhesives (OCA's), for example, to bind the respective layers together in the display stack.

By way of example, the display apparatus 110 can include a front stack 130 that includes a position encoded contrast layer 134. The position encoded contrast layer 134 can be disposed on a substrate. The substrate can be an optically transparent thin film or a layer to reflect non-visible light but be optically transmissive to visible light. The position encoded contrast layer 134 can include position encoded optical elements ELE 1, ELE 2, though ELE M, with M being a positive integer. A background area shown at example locations 136 of the contrast layer 134 can be encoded differently for polarized patterns (or non-near-IR absorptive when absorptive dot patterns employed) from the position encoded optical elements to provide contrast between the optical elements and the background area in response to non-visible light generated from a digital pen 140. As used herein, the term background area refers to any portion of the position encoded contrast layer 134 that is not occupied in space by the position encoded optical elements ELE 1 though ELE M formed therein. The non-visible light from the digital pen 140 includes infra-red (IR) light (e.g., about 750 to 1000 nanometer wavelength).

In one encoding example, the position encoded optical elements ELE 1, ELE 2, though ELE M can be polarized to a given polarization state (e.g., right hand circularly polarized). The background area 136 can be polarized to a different polarization state from the position encoded optical elements (e.g., left hand circularly polarized), where the difference in polarization states provides contrast in the pattern of light provided from the display, which can be utilized to detect spatial location of the digital pen 140. In another example, the position encoded optical elements ELE 1 though ELE M can be a near-IR absorptive pattern and the background area 136 can be a non near-IR absorptive area so as to provide contrast in the pattern of light provided from the display according to differences in the absorptive optical characteristics between the elements and the background area. In each of these examples the position encoded optical elements ELE 1 though ELE M and the background area 136 can be optically transparent to visible light from the display. Also, in some examples the position encoded optical elements ELE 1 though ELEM can be disposed on the front side or back side of the contrast layer 134 with respect to the direction of near IR light received from the digital pen 140.

In some examples, the digital pen 140 (illustrated with respect to FIG. 7 below) includes a strobed infrared light source (e.g., strobed at a respective duty cycle and frequency) to generate the non-visible incident light to the display. For example, the non-visible light from the digital pen 140 is received can be optically affected (e.g., polarized, reflected or absorbed) by the position encoded contrast layer 134 to generate an output pattern of reflected light that is encoded to indicate location and/or movements of the digital pen 140 as it is directed toward the display apparatus 110.

By way of example, an optical detector, such as a CMOS imager or CCD imager or sensor (not shown) in the digital pen 140, can then receive the pattern of non-visible light from the display and determine an indication of the pen's location and/or movement based on the received pattern of light. As disclosed herein, the pattern of non-visible light provided from the display represents a contrast between characteristics implemented by the position encoded optical elements and the background area 136. For example, the position encoded optical elements ELE 1 though ELE M can reflect non-visible light (e.g., near IR light) and the background area 136 can be non-absorptive to the non-visible light where the difference between element absorption and non absorption of the background area encode a spatial pattern.

In yet another example, the position encoded contrast layer 134 can include different polarized-encoded patterns such that the non-visible light from the display includes a pattern of different polarization states that encodes spatial information for the digital pen 140. As used herein, spatial information defines a position of the digital pen 140 with respect to the display stack 120 such that an image of the encoded pattern can be analyzed by one or more processors to determine a location of the pen in a two dimensional coordinate system corresponding to the front display that carries the encoded pattern. In such examples, the position encoded optical elements ELE 1 though ELE M may be patterned as a circular polarized pattern in one direction (e.g., ¼ wavelength retarded) and the background area 136 polarized with a circular polarized pattern in the opposite direction. A polarizer analyzer (not shown) in the digital pen 140 can discriminate between the differently (e.g., oppositely) polarized light provided in the non-visible light pattern according to the polarization states of the position encoded optical elements and the background area 136.

A hot mirror 150 can reflect the non-visible light applied to the position encoded contrast layer 134 of the front stack 130 and is optically transparent to visible light generated from the display stack. For example, the hot mirror 150 can be fabricated as a dielectric mirror (e.g., a coating operating as a dichroic filter) to reflect infrared light back toward a light source such as the digital pen 140, while concurrently allowing visible light to pass through the hot mirror, such as including the display image generated from the display stack 120. One or more hot mirrors 150 can be inserted into the display stack at a predetermined incidence angle (e.g., varying between about zero and 45 degrees). Non-visible wavelengths reflected by the hot mirror 150 can range from about 700 to 1250 nanometers, for example. The hot mirror 150 can transmit wavelengths ranging from about 390-700 nanometers.

As shown in the example of FIG. 1, a display image is transmitted from the display stack 120 though the hot mirror 150 and is visible to the user at the output of the display apparatus 110. The hot mirror 150 can be employed to increase the contrast between the position encoded optical elements 134 and their associated background area 136 by increasing the amount of non-visible (e.g., IR) light received at the digital pen 140. By increasing the amount of non-visible light (e.g., either from the position encoded optical elements or the background area for polarized patterns, or from the position encoded optical elements for absorptive dot patterns), the digital pen 140 can receive and consequently decode a stronger signal having a higher signal to noise ratio (SNR) (e.g., greater contrast difference between position encoded optical elements and background) causing higher SNR).

The position encoded contrast layer 134 can be positioned in the front stack 130, such as shown in FIG. 1. For example, the position encoded contrast layer 134 can be formed on a substrate layer in the front stack to provide desired optical characteristics for providing the pattern of light to encode spatial information for a surface of the display. In other examples, the position encoded contrast layer 134 (e.g., near-IR absorptive position encoded optical elements) can be disposed on the hot mirror 150 itself (e.g., near IR pattern printed/deposited on hot mirror), where the hot mirror acts operates as the background area 136. For example, position encoded optical elements can be disposed on a surface of the hot mirror 150 and be absorb near-IR radiation from the non-visible light source (near infra-red).

The hot mirror 150 can be positioned in the front stack 130, in the display stack 120 or be a separate layer between the front stack and the display stack, such as shown in FIG. 1. In response to being illuminated by a non-visible light source, such as the digital pen 140, the position encoded contrast layer 134 provides encoded spatial data in the optical pattern of light reflected to the detector where it can be decoded to determine spatial position and/or movements of the digital pen 140 relative to the display apparatus 110, such as recording a digital signature, for example.

By way of further example, the hot mirror 150 can implement at least two types of reflection patterns that can be utilized to obtain encoded information from the position encoded contrast layer 134. In one example, specular reflection can be employed; however, specular reflection is angular dependent relative to the orientation of the digital pen 140 with respect to the display apparatus 110. Although specular hot mirrors 150 can be employed, less reflected light may be received depending on the angular orientation of the digital pen 140.

In another example, the hot mirror 150 can provide a diffuse reflection pattern for a predetermined non-visible wavelength spectrum. With diffuse reflection, the hot mirror 150 evenly diffuses the reflection over a large distribution pattern which minimizes the dependence on pen orientation with respect to the display apparatus 110. Thus, the hot mirror 150 in some examples can provide diffuse reflections across the near-IR range of about 725 to about 1000 nm wavelength. The hot mirror 150 can also be tuned to a specific near-IR wavelength (e.g., approximately 750 nm, 950 nm, and so forth) by controlling parameters of the hot mirror 150 (e.g., thickness and material parameters).

Diffuse hot mirrors can be based on micro-structured refractive surface topographies on plastic film with engineered reflective orientation distributions (e.g., diffuse, retro-reflective, isotropic) and provide selective wavelength light reflection characteristics. One example includes a holographic light diffuser to produce a small but highly scattered (diffuse) reflection or retro-directive reflection (back at the pen) or a combination of both for reflective modalities for both visible and near-IR light. This reflective micro-structure may then be dichroically coated with a layer stack tuned to reflect highly at the selected near-IR wavelength desired (e.g., about 850 nm). This would maintain clear visibility in the visible light spectrum (e.g., anti-glare film appearance) while affecting high scattered/diffuse reflection in the near-IR. An example supplier of such hot mirror includes Luminit Corporation of Torrance Calif. Other examples of some specular and diffuse hot mirrors will be illustrated and described herein with respect to FIGS. 3A-3C.

Figure 2:
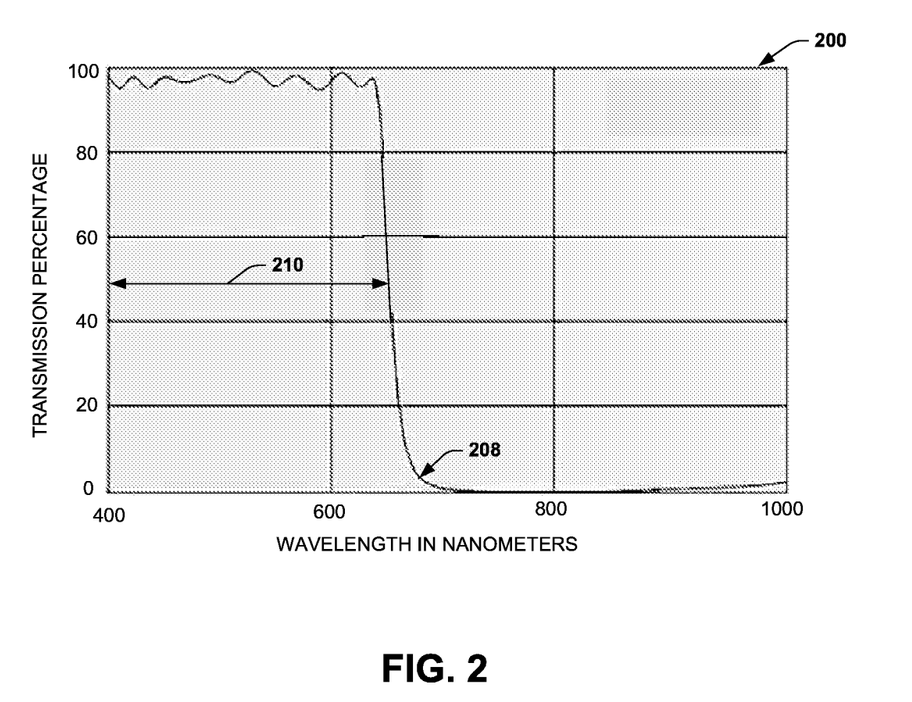
FIG. 2 illustrates an example diagram illustrating hot mirror properties to facilitate reception of position encoded optical information from a display while being optically transparent to visible information generated from the display in accordance with the principles disclosed herein.

FIG. 2 illustrates an example diagram 200 illustrating hot mirror properties to facilitate reception of position encoded optical information from a display while being optically transparent to visible information generated from the display in accordance with the principles disclosed herein. The diagram 200 illustrates the optical transmissive qualities of an example hot mirror such as described above with respect to FIG. 1. The vertical axis of the diagram 200 represents the percentage of light that is passed though the hot mirror. The horizontal axis represents the wavelength of light from 400 nanometers on the left to 1000 nanometers on the right. As shown by the arrow 210, from about 400 nanometers to about 700 nanometers of the visible spectrum, the hot mirror transmissive characteristic is to pass about 100% of the visible portion of the spectrum (e.g., from about 400 nm to about 725 nm). At about 750 nanometers on the horizontal axis shown at 220 and representing the beginning of the infrared spectrum, the hot mirror becomes reflective and thus, substantially no light passes through the hot mirror at about 750 nanometers and above.

Figure 3A:
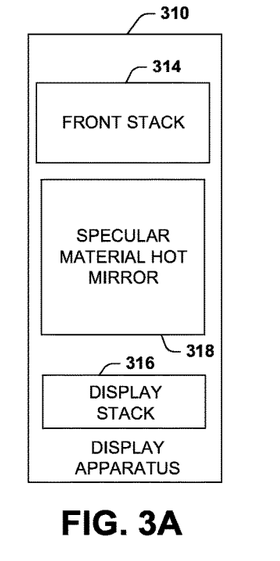
FIGS. 3A, 3B and 3C illustrate examples of display apparatuses including hot mirrors to facilitate reception of position encoded optical information in accordance with the principles disclosed herein.
Figure 3B:
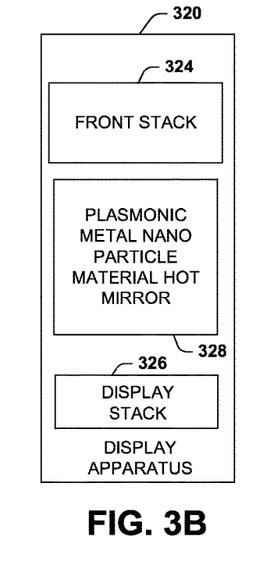
Figure 3C:
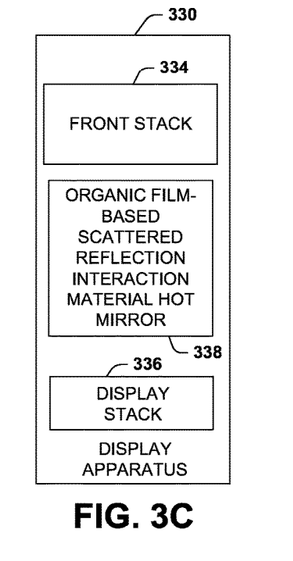

FIGS. 3A, 3B, and 3C illustrate some example configurations of hot mirrors to facilitate reception (e.g., at digital pen 140 of FIG. 1) of position encoded optical information from a display while being optically transparent to visible information generated from the display in accordance with the principles disclosed herein. In the example of FIG. 3A, a display apparatus 310 includes a front stack 314 and display stack 316. In this example, a specular material hot mirror 318 can be employed. The hot mirror 318, although shown between the front stack 314 and display stack 316, alternatively can be positioned within either of the front stack or the display stack. Specular hot mirrors 318 can be provided as thin plastic films and available from suppliers, such as 3M of St. Paul, Minn., or Deposition Sciences Incorporated (DSI) of Santa Rosa, Calif., for example. Such specular hot mirror films are typically vacuum sputtered to reflect longer wavelengths of light such as those in the near infrared spectrum, for example.

In the example of FIG. 3B, a display apparatus 320 includes a front stack 324 and display stack 326. In this example, a plasmonic metal (e.g., silver or gold) nano particle material hot mirror 328 (also referred to as plasmonic material hot mirror or film) can be employed. The hot mirror 328, although shown between the front stack 324 and display stack 326, can be positioned within either of the front stack or the display stack. The plasmonic material hot mirror 328 are diffuse reflecting mirrors to near IR and have metallic nano-particles of a specific diameter-to-thickness ratios coated on to their surface in a planar manner to cause plasmonic resonance from particle-tuned wavelength of light striking them. This plasmonic resonance then re-emits light in a scattered and reflective manner in the general direction of the illuminating source (e.g., digital pen). An example supplier for the plasmonic material hot mirror 328 is Fujifilm.

For the example where the hot mirror 328 includes plasmonic nano-particles, nano-particles of appropriate size, shape, material and binder can be tuned to a particular near-IR wavelength such that they will scatter a larger portion of the tuned near-IR radiance striking the film. This nano-particle film can be substantially transparent in the visible light spectrum. For example, the film can be fabricated from nano-platelet silver particle tuned for plasmonic resonance at about 850 nm. Silver nano-platelets suspended in random orientations within a clear binder material and having platelet aspect ratios of approximately 10:1 (e.g., diameter of about 120 nm and thickness of about 12 nm) can produce this type of diffuse near-IR scattered reflection at about 850 nm.

In an alternative example, a plasmonic particle diffuse hot mirror 328 can incorporate spherical nano-particles suspended in a clear (e.g., optically transparent) binder. This can include the use of approximately 230 nm diameter solid silver nano-particles distributed in a clear binder deposited in a planar layer on a thin optically clear plastic film to provide about 850 nm scattering for the hot mirror, for example. Loading of such nano-particles can be tuned to a level to balance the properties of near-IR scattered reflection (e.g, by including more nano-particles) and visible light transmission (e.g, by including less nano-particles) according to application requirements.

Example nano particle dimensions for controlling hot mirror properties include solid silver nanoparticles having approximately 230 nm diameter. In another example, silica core/silver shell nanoshells can be employed having approximately 170 nm diameter core with about a 20 nm thickness shell. In yet another example, silver nanoplates at approximately 120 nm in diameter can be employed. Solid gold nanoparticles can be produced at approximately 230 nm in diameter and silica core/gold shell nanoshells with about a 150 nm diameter core and about 15 nm thickness shell can be employed for other examples.

In the example of FIG. 3C, a display apparatus 330 includes a front stack 334 and display stack 336. In this example, an organic film-based scattered reflection interaction material hot mirror 338 (also referred to as organic material hot mirror) can be employed. The hot mirror 338, although shown between the front stack 336 and display stack 338, can be positioned within either of the front stack or the display stack. The organic material hot mirror 338 is another example of a hot mirror material that re-emits light in a scattered and reflective manner in the general direction of the illuminating source. An example supplier for the organic material hot mirror 338 is Fujifilm that manufactures a material commercially available under the product name WAVISTA.

Figure 4:
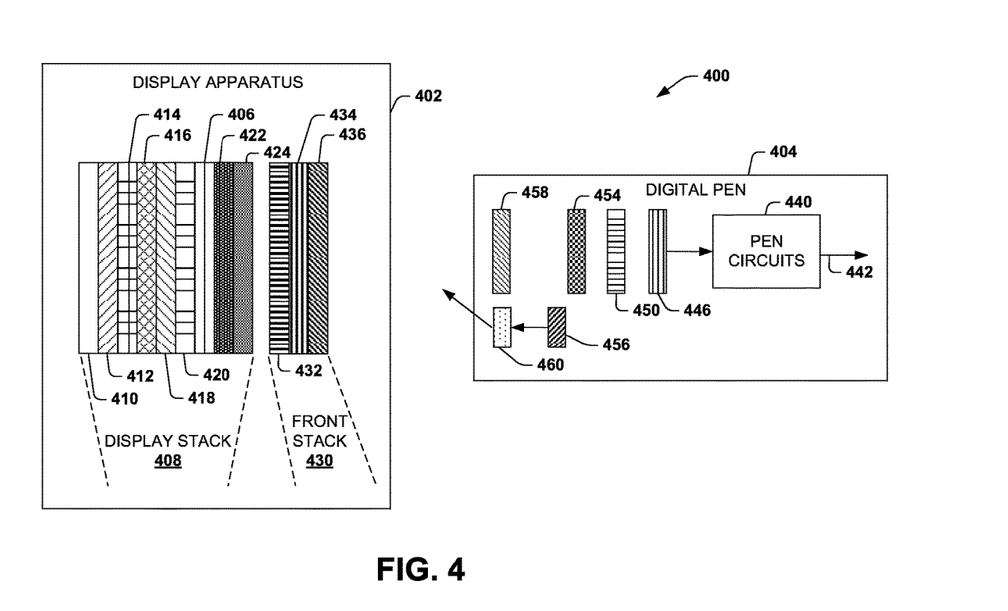
FIG. 4 illustrates an example of a display system where a hot mirror is positioned within a display stack of a display apparatus in accordance with the principles disclosed herein.

FIG. 4 illustrates an example system 400 that includes a display apparatus 402 and digital pen 404. In this example, a hot mirror 406 is positioned within a display stack 408 of the display apparatus 402 in accordance with the principles disclosed herein. In this example, the display stack 408 can include a reflective film layer 410 followed by a backlight layer 412 (e.g., fiber optic or LED backlight). A light diffuser film layer 414 follows the backlight layer 412 and is followed by a linear polarizer film layer 416. An image generation layer 418 is provided to generate digital images from the display stack 408. The image generation layer 418 can be a liquid crystal module. In other examples, the image generation layer 418 could alternatively be an LED module or a plasma display module, for example to generate the digital images. The image generation layer 418 can be followed by a color filter film 420 which in turn can be followed by the hot mirror 406.

The hot mirror 406 can be followed by a linear polarizer filter 422 to provide brightness control. The hot mirror 406 can alternatively be positioned one or more layers to the left or the right of the example position placement depicted in the example display apparatus 402. A front glass (or plastic) layer 424 can be provided as the outmost layer for the display stack 408. A front stack 430 includes a position encoded layer 432. The position encoded layer 432 can include alternative encoding patterns. In one example, the encoding pattern can include a near-IR absorptive pattern (e.g., near-IR ink dot deposited on film) which is described below with respect to FIG. 7. In another example, the encoding pattern can include a polarized encoded pattern (e.g., film pattern retarder ¼ wavelength retarded at 750 nanometers) such as described below with respect to FIG. 8. The front stack 430 can also include a touch sensor 434 to provide user input capability. The touch sensor 434 may not be present in other examples. The touch sensor 434 may be covered by a display cover lens which can be made of plastic or glass, for example.

The digital pen 404 can include differing layers depending on whether or not near-IR encoding or polarized-encoding is employed by the position encoded optical elements of the display apparatus 402. In either example, the digital pen 404 includes one or more pen circuits 440. The pen circuits 440 can include a processor circuit and software to enable decoding of the position encoded optical elements detected by the digital pen 404. The pen circuits 440 can include LED synchronization circuits (e.g., duty cycle and frequency to strobe IR LED), memories for decoding and digital packetization of the decoded pen data, and other software modules to operate the pen with respect to position encoded optical elements received from the display apparatus 402.

Output from the pen circuits 440 can be sent via physical or wireless connection (e.g., Bluetooth) 442 to a computer (not shown) that operates the display apparatus 402, where pen movements detected by the digital pen 404 can be recorded and integrated with respective display images and applications.

Position encoded optical data received from the display apparatus 402 is digitized by an electronic imager 446 (e.g., CCD sensor, CMOS sensor, and so forth). An imaging lens 450 can be arranged to precede the electronic imager 446. A long pass near-IR filter 454 can be provided for near-IR encoded systems. This filter 454 may or may not be included with a polarized encoded system as described herein. A pulsed (also referred to as strobed) LED 456 is provided to excite the position encoded optical elements of the display apparatus 402. The LED can generate light at about a 750 nanometer (or other non-visible light) wavelength, for example, and turned off and on (e.g., strobed) at a given duty cycle and frequency.

The LED 456 can be controlled to strobe at about the same rate as the electronic imager 446 captures digital information which can be at a rate from about 70 to about 120 hertz (Hz), for example. The frame duration or period of the imager 446 can be at about 100 Hz. The LED strobe duration can be on the order of tens to hundreds of microseconds during the respective imager frame period, for example. This has the effect of freezing the image of the position encoded optical elements (e.g., encoded dots on a background layer) as the digital pen 404 moves across the display apparatus 402. This freezing effect acts like a flash-bulb in stop-motion photography applications and facilitates capturing encoded data received from the display apparatus 402 accurately even if the pen is moved in a rapid manner across the display. A circular polarizer analyzer 458 can be included with polarized encoded systems which is described below with respect to FIG. 8.

In some examples, the digital pen 404 can also include a holographic diffuser 460 to increase transmission efficiency of the light source 456. The holographic diffuser 460 has the effect of diffusing or scattering the light from the LED 456 which facilitate causing diffused light to be reflected back to the digital pen from the display apparatus 402 and hot mirror 406. The holographic diffuser 460 mitigates angular sensitivity of the hot mirror 406, such as from specular hot mirrors that do not reflect a substantially diffuse pattern. By diffusing the LED light at the digital pen 404, angular sensitivity of the digital pen can be mitigated, such as when specular (or diffuse) hot mirrors are employed with the display apparatus 402.

Figure 5:
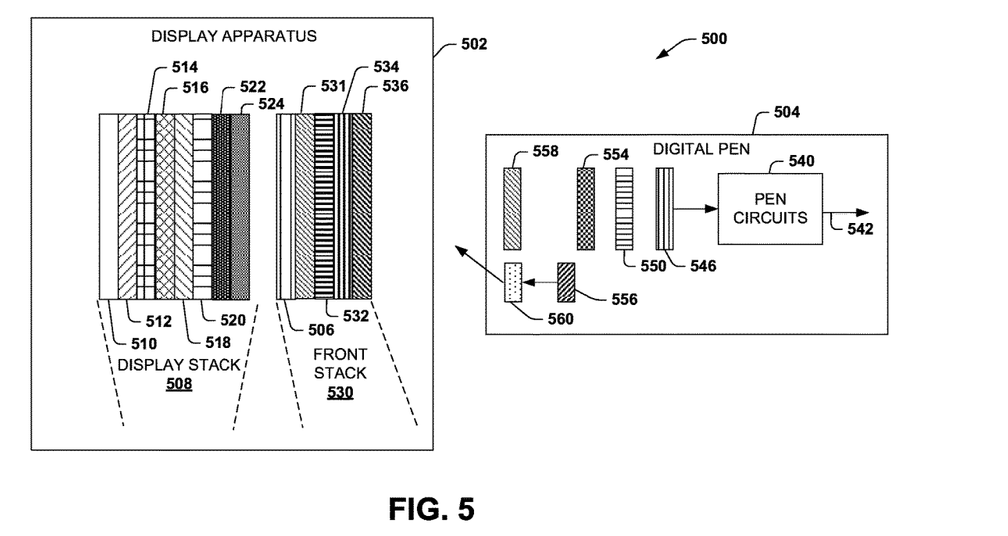
FIG. 5 illustrates an example display system where a hot mirror is positioned within a front stack of the display apparatus in accordance with the principles disclosed herein.

FIG. 5 illustrates an example system 500 that includes a display apparatus 502 and digital pen 504 in accordance with the principles disclosed herein. In the example of FIG. 5, a hot mirror 506 is positioned within a front stack of the display apparatus 502. In this example, a display stack 508 can include a reflective film layer 510 followed by a backlight layer 512 (e.g., fiber optic backlight). A light diffuser film layer 514 follows the backlight layer 512 and is followed by a linear polarizer film layer 516. A digital image generation module 518 is provided to generate digital images from the display stack 508. The digital image generation module 518 can be implemented as a liquid crystal module 518. In other examples, the digital image generation module 518 could alternatively be an LED module or a plasma display module, for example. The liquid crystal module 518 can be followed by a color filter film 520 which in turn can be followed a linear polarizer filter 522 to provide brightness control. A front glass (or plastic) layer 524 can be provided as the outmost layer for the display stack 508.

In the example of FIG. 5, the front stack 530 includes the hot mirror 506 which can be followed linear polarizer filter 531 which in turn can be followed by a position encoded layer 532. The position encoded layer 532 can include a polarized encoded pattern (e.g., film pattern retarder ¼ wavelength retarded at 750 nanometers) which is described below with respect to FIG. 8. The hot mirror 506 can include a plasmonic nano material, for example, such as described above with respect to FIG. 3. The front stack 530 can also include a touch sensor 534 to provide user input capability. The touch sensor 534 may not be present in other examples. The touch sensor 534 may be covered by a display cover lens 536 which can be made of plastic or glass, for example.

The digital pen 504 includes one or more pen circuits 540. The pen circuits 540 can include a processor circuit and software to enable decoding of the position encoded information in the received pattern of light from the display apparatus that is detected by the digital pen 504. The pen circuits 540 can include LED synchronization circuits (e.g., duty cycle and frequency to strobe IR LED), memories for decoding and digital packetization of the decoded pen data, and other software modules to operate the pen with respect to position encoded optical elements received from the display apparatus 502. Output from the pen circuits 540 can be sent via physical or wireless connection (e.g., Bluetooth) 542 to a computer (not shown) that operates the display apparatus 502, where pen movements detected by the digital pen 504 can be recorded and integrated with respective display applications.

Position encoded optical data received from the display apparatus 502 is digitized by an electronic imager 546 (e.g., CCD sensor, CMOS sensor, and so forth). An imaging lens 550 can precede the electronic imager 546. A long pass near-IR filter 554 can be provided. This filter 554 may or may not be included with a polarized encoded system as described herein. A pulsed (also referred to as strobed) LED 556 is provided to excite the position encoded optical elements of the display apparatus 502. The LED can be a 750 nanometer wavelength for example and turned off and on at a given duty cycle and frequency.

The LED 556 can be strobed at the same rate as the electronic imager 546 captures digital information which can be at a rate from about 70 to about 120 hertz (Hz), for example. The frame duration or period of the imager 546 is typically at 100 Hz. The LED strobe duration can be on the order of tens to hundreds of microseconds during the respective imager frame period, for example. This has the effect of freezing the image of the position encoded optical elements (e.g., dots) as the digital pen 504 moves across the display apparatus 502. This freezing effect acts like a flash-bulb in stop-motion photography applications and facilitates capturing encoded data received from the display apparatus 502 accurately even if the pen is moved in a rapid manner across the display. A circular polarizer analyzer 458 can be included with a polarized encoded system which is described below with respect to FIG. 8. Another component that can be included in the digital pen 504 is a holographic diffuser 560. The holographic diffuser 560 has the effect of diffusing or scattering the light from the LED 556 which causes diffused light to be reflected back from the display apparatus 502 and hot mirror 506.

Figure 6:
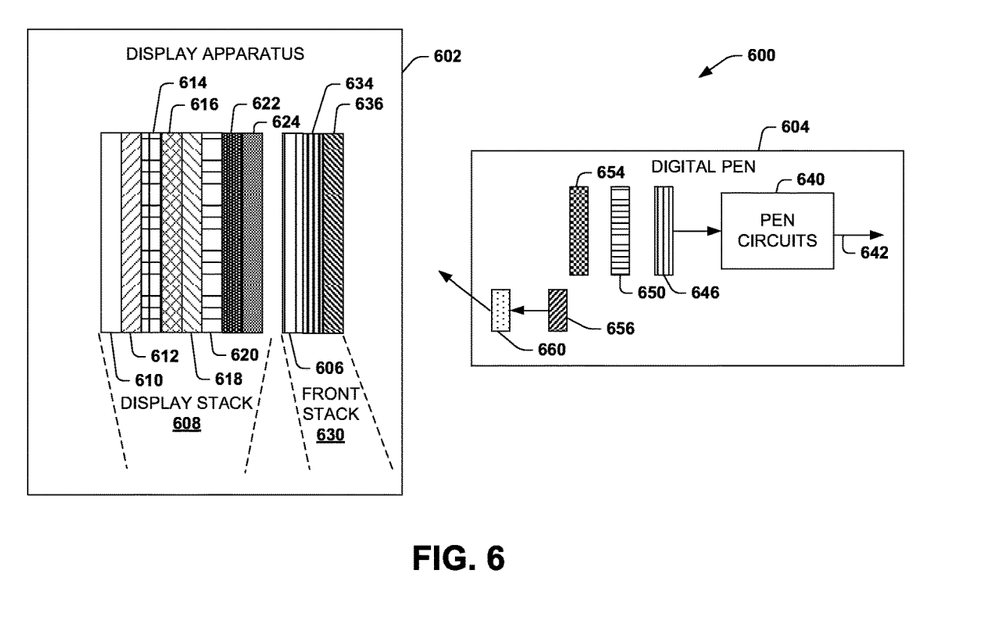
FIG. 6 illustrates an example display system where position encoded optical elements are deposited on a hot mirror positioned within a front stack of the display apparatus in accordance with the principles disclosed herein.

FIG. 6 illustrates an example system 600 that includes a display apparatus 602 and digital pen 604, where position encoded optical elements are deposited on a hot mirror 606 positioned within a front stack of the display apparatus in accordance with the principles disclosed herein. In this example, a display stack 608 can include a reflective film layer 610 followed by a backlight layer 612 (e.g., fiber optic backlight). A light diffuser film layer 614 follows the backlight layer 612 and is followed by a linear polarizer film layer 616. A liquid crystal module 618 is provided to generate digital images from the display stack 608. The liquid crystal module 618 could alternatively be an LED module or a plasma display module, for example. The liquid crystal module 618 can be followed by a color filter film 620 which in turn can be followed a linear polarizer filter 622 to provide brightness control. A front glass (or plastic) layer 624 of optically transparent material (transparent to both visible and non-visible light) can be provided as the outmost layer for the display stack 608.

A front stack 630 includes the hot mirror 606. In this example, position encoded optical elements can be printed or deposited as near-IR absorptive dots on the hot mirror 606, where the hot mirror provides the background area for the respective dots. In this example, the hot mirror 606 can be an organic material hot mirror, such as described above with respect to FIG. 3. The front stack 630 can also include a touch sensor 634 to provide user input capability. The touch sensor 634 may not be present in other examples. The touch sensor 634 may be covered by a display cover lens 636 which can be made of plastic or glass, for example.

The digital pen 604 includes one or more pen circuits 640. The pen circuits 640 can include a processor circuit and software to enable decoding of the position encoded optical elements detected by the digital pen 604. The pen circuits 640 can include LED synchronization circuits (e.g., duty cycle and frequency to strobe IR LED), memories for decoding and digital packetization of the decoded pen data, and other software modules to operate the pen with respect to position encoded optical elements received from the display apparatus 602. Output from the pen circuits 640 can be sent via physical or wireless connection (e.g., Bluetooth) 642 to a computer (not shown) that operates the display apparatus 602, where pen movements detected by the digital pen 604 can be recorded and integrated with respective display applications.

Position encoded optical data received from the display apparatus 602 is digitized by an electronic imager 646 (e.g., CCD sensor, CMOS sensor, and so forth). An imaging lens 650 can precede the electronic imager 646. A long pass near-IR filter 654 can be provided. A pulsed (also referred to as strobed) LED 656 is provided to excite the position encoded optical elements of the display apparatus 602. The LED can be a 750 nanometer wavelength for example and turned off and on at a given duty cycle and frequency.

The LED 656 can be strobed at about the same or a fractional rate as the electronic imager 546 captures digital information which can be at a rate from about 70 to about 120 hertz (Hz), for example. The frame duration or period of the imager 646 is typically at 100 Hz. The LED strobe duration can be on the order of tens to hundreds of microseconds during the respective imager frame period, for example. This has the effect of freezing the image of the position encoded optical elements (e.g., dots) as the digital pen 604 moves across the display apparatus 602. This freezing effect acts like a flash-bulb in stop-motion photography applications and facilitates capturing encoded data received from the display apparatus 602 accurately even if the pen is moved in a rapid manner across the display. Another component that can be included in the digital pen 604 is a holographic diffuser 660. The holographic diffuser 660 has the effect of diffusing or scattering the light from the LED 656 which causes diffused light to be reflected back from the display apparatus 602 and hot mirror 606.

Figure 7:
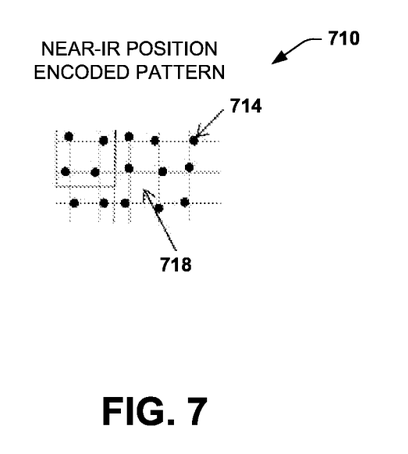
FIG. 7 illustrates an example of a pattern of position encoded optical elements in accordance with the principles disclosed herein.

FIG. 7 illustrates an example of a near-IR position encoded pattern of position encoded optical elements in accordance with the principles disclosed herein. In the example of FIG. 7, a near-IR encoded pattern 710 includes near-IR absorptive position encoded optical elements 714 that are positioned on a non near-IR absorptive background 718 (e.g., thin film background area or hot mirror itself). Thus, in this example, when near-IR radiation is applied to the pattern 710, the elements 714 absorb the radiation. As disclosed herein, the background 718 can provide a substrate layer that carries the pattern of elements 714, which layer can be optically transmissive to the near-IR radiation (as well as to radiation in the visible spectrum). In another example, if the pattern of elements 714 is disposed on the hot mirror itself, which provides the substrate for carrying the elements, the hot mirror substrate can be reflective of the near-IR radiation. The near-IR radiation applied provides contrast between the background 718 and the elements 714 that can be similarly utilized for decoding of location of a source such as a digital pen, for example. The hot mirrors described herein can enhance the contrast between the elements 714 and the background 718. This pattern 710 can provide a corresponding pattern in reflected light that is provided to the detector, which results from the contrast between absorbed and reflected light from the hot mirror. The detector can, in turn, detect and discriminate between differences in the pattern of reflected light to determine a location, such as a location with respect to a digital pen described above. In one example, the position encoded elements 714 can be dots (e.g., small ellipses) on the background 718 (or hot mirror). Substantially any shape can be employed for the elements (e.g., circle, square, triangle, and so forth).

Figure 8:
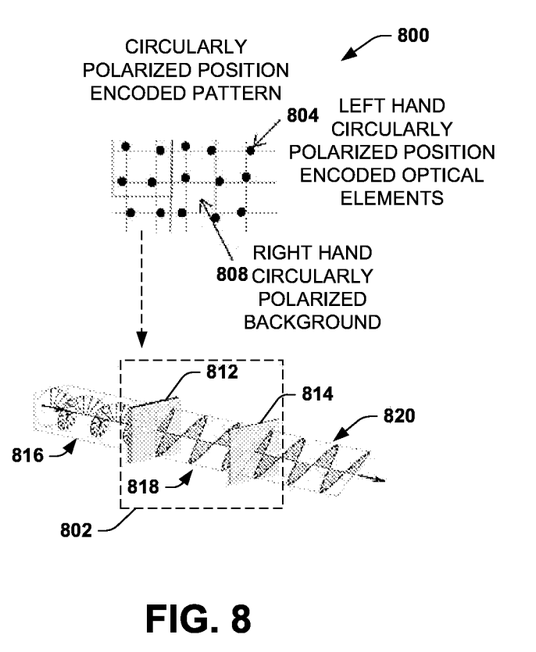
FIG. 8 illustrates an example of a circularly polarized pattern of position encoded optical elements and an analyzer to decode the position of the encoded pattern in accordance with the principles disclosed herein.

FIG. 8 illustrates an example of a circularly polarized position encoded pattern 800 and an analyzer 802 to decode the position of the encoded pattern in accordance with the principles disclosed herein. As used herein, a circularly polarized pattern refers to at least two optical elements providing the pattern that are polarized in different directions. For example, one optical element of the pattern 800 can be encoded as ¼ wavelength to the left and another optical element of the pattern 800 can be encoded as ¼ wavelength to the right such as further described below. The pattern 800 can include position encoded optical elements 804 polarized to one of at least two polarization states and a background 808 polarized to another of the at least two polarization states. Thus the pattern provides a pattern of light to the analyzer having at least two polarization states to encode the spatial information across a surface of the position encoded contrast layer described above. In this example, the pattern 800 includes left hand circularly polarized position encoded optical elements 804 (also referred to as elements) that are patterned on or within a right hand circularly polarized background 808. As used herein, the term circularly polarized can refer to one quarter (or other fractional) wavelength retarding of light that is applied to the elements 804 and background 808. The terms left and right refer to the direction of the retarding. In some examples, the elements 804 can be right hand circularly polarized and the background 808 could be left hand circularly polarized. In some examples, the respective elements 804 and background 808 are polarized in opposite directions in order to provide contrast between the background and the respective elements. The pattern 800 can be provided on a film pattern retarder layer, for example, such as illustrated and described above with respect to FIG. 4.

The analyzer 802 (also referred to as a circular polarizer analyzer) can include ¼ wavelength retarder layer 812 followed by a linear polarizer layer 814. As shown, circularly polarized light 816 received from the pattern 800 is converted to linear polarized light at 818 via the retarder layer 812. The linear polarized light 818 is further polarized via linear polarizer 814 into polarized output light at 820 which can be subsequently analyzed via an image sensor and processor in a digital pen, for example, to determine location and movement of the pen via light received from the circularly polarized pattern 800.

Figure 9:
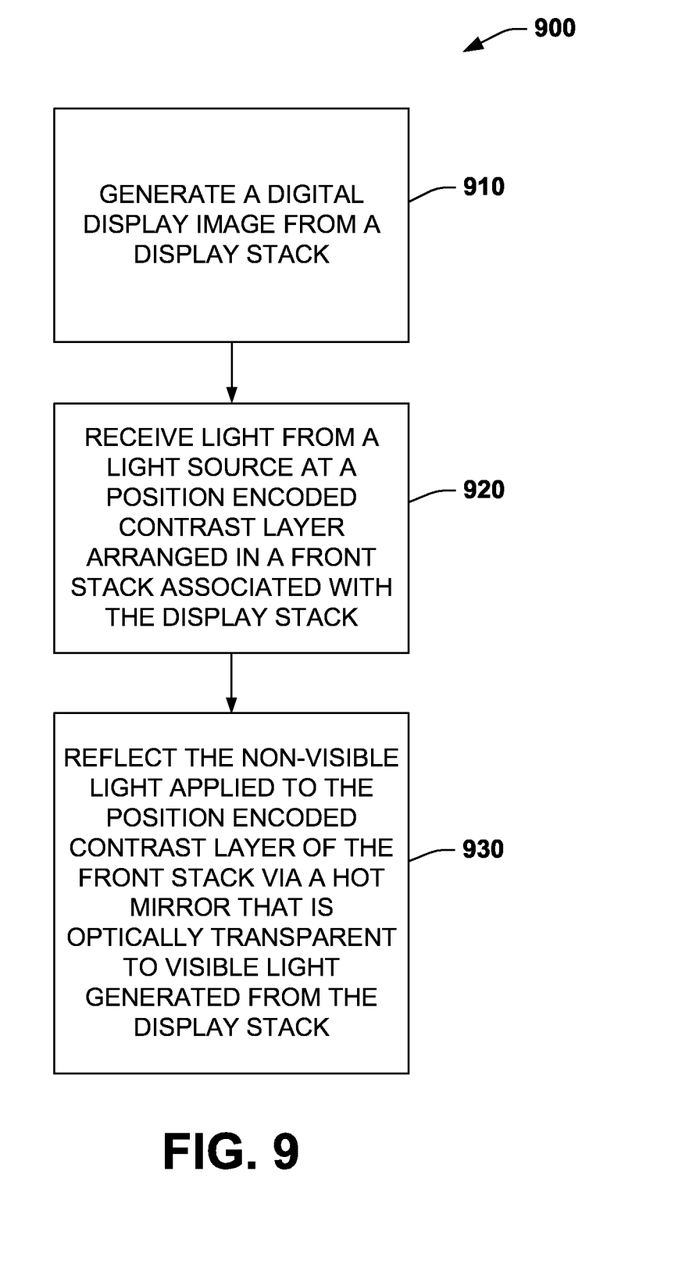
FIG. 9 illustrates an example of a method to detect position encoded optical information from a display in accordance with the principles disclosed herein.

In view of the foregoing structural and functional features described above, an example method will be better appreciated with reference to FIG. 9. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components and executed by an integrated circuit, computer, or a controller, for example.

FIG. 9 illustrates an example of a method 900 to facilitate detection of position encoded optical information from a display in accordance with the principles disclosed herein. At 910, the method 900 includes generating a digital display image from a display stack (e.g., via display stack 120 of FIG. 1). At 920, the method 900 includes receiving light from a light source at position encoded contrast layer arranged in a front stack associated with the display stack (e.g., via front stack 130 of FIG. 1). The position encoded contrast layer provides a pattern of light in response to non-visible light applied to the position encoded contrast layer. The pattern of light encodes spatial information across a surface of the position encoded contrast layer. At 930, the method 900 includes reflecting the non-visible light applied to the position encoded contrast layer of the front stack via a hot mirror (e.g., via hot mirror 150 of FIG. 1) that is optically transparent to visible light generated from the display stack. The method 900 can also include decoding the non-visible light applied to the position encoded contrast layer reflecting from the front stack to determine location and movement of a digital pen, for example.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An apparatus, comprising:
   a display stack comprising at least one layer to generate a digital display image;
   a front stack that includes a position encoded contrast layer to provide a pattern of light in response to non-visible light applied to the position encoded contrast layer, the pattern of light encoding spatial information across a surface of the position encoded contrast layer; and a hot mirror to reflect the non-visible light applied to the position encoded contrast layer of the front stack and being optically transparent to visible light generated from the display stack, wherein the hot mirror is disposed between the at least one layer to generate a digital display image in the display stack and the position encoded contrast layer of the front stack.

2. The apparatus of claim 1, wherein the hot mirror is one of a layer of the display stack or is a layer of the front stack.

3. The apparatus of claim 1, wherein the position encoded contrast layer further comprises position encoded optical elements and a background area to encode the spatial information across the surface of the position encoded contrast layer, and wherein the front stack further comprises the hot mirror having the position encoded optical elements disposed thereon.

4. The apparatus of claim 1, wherein the hot mirror comprises at least one layer to generate a diffuse reflection of the non-visible light applied to the position encoded contrast layer of the front stack.

5. The apparatus of claim 1, wherein the at least one layer comprises a plasmonic metal particle material to generate the diffuse reflection of the non-visible light applied to the position encoded contrast layer of the front stack.

6. The apparatus of claim 4, wherein the at least one layer comprises an organic scattered reflection interaction material to generate a diffuse reflection of the non-visible light applied to the position encoded contrast layer of the front stack.

7. The apparatus of claim 1, wherein the position encoded contrast layer further comprises position encoded optical elements and a background area to encode the spatial information across the surface of the position encoded contrast layer, the position encoded optical elements including a near-IR absorptive material and the background area including a non near IR absorptive material to encode the spatial information across a surface of the position encoded contrast layer.

8. The apparatus of claim 1, wherein the position encoded contrast layer includes position encoded optical elements polarized to one of at least two polarization states and a background area polarized to another of the at least two polarization states to provide the pattern of light having the at least two polarization states to encode the spatial information across a surface of the position encoded contrast layer.

9. The apparatus of claim 1, wherein the hot mirror comprises specular material.

10. The apparatus of claim 1, wherein the hot mirror comprises plasmonic metal nano particle material.

11. The apparatus of claim 1, wherein the hot mirror comprises organic film-based scattered reflection interaction material.

12. The apparatus of claim 1, further comprising a color filter film between the image generation layer and the hot mirror.

13. The apparatus of claim 1, further comprising a linear polarizer filter between the hot mirror and the position encoded contrast layer of the front stack.

14. A system, comprising:
a display stack comprising at least one layer to generate a digital display image;
a front stack that includes a position encoded contrast layer to provide a pattern of light in response to non-visible light applied to the position encoded contrast layer, the pattern of light encodes spatial information across a surface of the position encoded contrast layer;
a hot mirror to reflect the non-visible light applied to the position encoded contrast layer of the front stack and being optically transparent to visible light generated from the display stack; and
an optical source to generate the non-visible light,
wherein the hot mirror is disposed between the at least one layer to generate a digital display image in the display stack and the position encoded contrast layer of the front stack.

15. The system of claim 14, further comprising a detector to detect a location of the optical source based on reception of the non-visible light reflected from the hot mirror and the position encoded contrast layer.

16. The system of claim 14, wherein the optical source is to provide the non-visible light strobed at a predetermined frequency and duty cycle.

17. The system of claim 14, further comprising a holographic diffuser to diffuse the non-visible light generated from optical source.

18. The system of claim 14, wherein the hot mirror comprises a plasmonic nano particle material or an organic scattered reflection interaction material.

19. A method, comprising:
generating a digital display image from a display stack;
receiving light from a light source at position encoded contrast layer arranged in a front stack associated with the display stack, the position encoded contrast layer to provide a pattern of light in response to non-visible light applied to the position encoded contrast layer, the pattern of light encodes spatial information across a surface of the position encoded contrast layer; and
reflecting the non-visible light applied to the position encoded contrast layer of the front stack via a hot mirror that is optically transparent to visible light generated from the display stack,
wherein the hot mirror is located between the at least one layer to generate a digital display image in the display stack and the position encoded contrast layer of the front stack.

20. The method of claim 19, further comprising decoding the non-visible light applied to the position encoded contrast layer reflecting from the front stack to determine at least one of position or movement of a source of the non-visible light.

* * * * *